May 5, 1970     D. A. KELLY     3,509,719

STIRLING ENGINE POWER SYSTEM

Filed June 10, 1968     2 Sheets—Sheet 1

INVENTOR.
Donald A Kelly

May 5, 1970  D. A. KELLY  3,509,719
STIRLING ENGINE POWER SYSTEM
Filed June 10, 1968  2 Sheets-Sheet 2

INVENTOR.
Donald A Kelly 3,509,719
STIRLING ENGINE POWER SYSTEM
Donald A. Kelly, 58—6 69th Place,
Maspeth, New York, N.Y. 11378
Filed June 10, 1968, Ser. No. 735,613
Int. Cl. F03g 7/06; F25b 9/00
U.S. Cl. 60—24                                                8 Claims

ABSTRACT OF THE DISCLOSURE

The Stirling engine power system is comprised of several units which provide reliable heating, cooling and pressurization to achieve high operating efficiencies for all types of Stirling engines.

Two separate heating units are utilized so that quick starting is provided by the first with the second unit providing economical operation for normal running.

An air and liquid cooling means are arranged for the cold section of the engine.

A power boosted air pressure pump unit is provided for engine pressurization and pressure level control.

---

This invention relates to a Stirling engine power system which provides a dual heating arrangement and a dual cooling method for high operating efficiency and power output.

Many types of Stirling engines have been proposed and constructed with varying degrees of success with most of the effort concentrated on internal features and arrangements. It is the purpose of this invention to introduce new and versatile external control means to Stirling engine art. Heretofore only single types of heating means have been considered so that nearly instantaneous heating was not possible and therefore prevented the Stirling engine from being considered for automotive use.

The application of a power boosted pressure cylinder and pump would provide a rapid and full range of speeds for all operating conditions.

For rapid heating when the engine is started an electrical heating arrangement is utilized and when the engine is running at a normal level the electrical heating is switched off automatically by a timer and the engine then runs on the main catalytic or liquid fuel heating unit for operating economy.

This method allows further versatility in that the heat level may be rapidly changed to meet the demand of engine speed acceleration. The electrical heating means cannot be applied for extended intervals since battery amperage would be depleted too quickly. The hot side of the engine would be fitted with multiple heat rods threaded directly into the block and energized by parallel circuitry so that each rod is individually controlled.

This arrangement would provide a heat gradient to meet the engine's heat level requirement at any given period. An alternator is provided to restore current to the battery when the engine is running under normal conditions.

The second heating source consists of a catalytic heater unit with a fuel supply and return-to-tank pump arrangement. The catalytic heater would consist of multiple trays containing the catalytic elements and fuel. The multiple trays would provide for heat concentration at the heating surface.

The pump and fuel storage units prevent excessive fuel evaporation and provides for shutting down the heater when the engine is stopped.

The standard catalytic heater requires combustion priming before internal catalytic action starts. The details of the priming and ignition system required are not shown, but would be compatible to the system.

A separate alcohol tank and supply tube array would supply a metered amount of alcohol to the combustion mats above each tray. An automatic ignition system would ignite the alcohol which would be burned prior to catalytic action.

An alternate second heating source would consist of a liquid burner unit supplying a series of multiple flame jets. The multiple jets would heat the hot engine block and be shielded from air drafts and gusts. This heating choice would be the most economical in use but would not be the cleanest or as service free.

A propane heating unit may also be employed under certain operating conditions where less smoke exhaust is desirable.

The alternate heating source would provide higher operating temperatures for the engine than the catalytic type heater which would be suitable for certain lower power applications, and have the advantage of no-flame operation.

The catalytic heater would be completely silent while the burner unit would operate at a very low noise level.

The pressurization arrangement for the engine would consist of a pressure cylinder which is approximately equal or greater in volume to the internal volume of the engine. A reciprocating piston would be closely fitted within the cylinder to form a high pressure pump with the piston rod extending through a rear pressure gland. A power booster arrangement similar to an auto power steering unit will be arranged for reciprocating the piston within the pressure cylinder. The full excursion of the accelerator will cause the piston to move through its full linear travel with the power assist necessary in view of the high axial force required under the high engine working pressure. The accelerator pedal will travel through a greater distance and require a larger force than in a standard auto to match the requirements of the pressure cylinder. The response time between accelerator movement and engine speed increase would be just enough to be acceptable for most applications.

The pressure line from the base of the pressure cylinder would enter the engine block at the power bore which is at mean temperature.

The pressure system would be arranged to provide a temporary back pressure to conveniently stop the engine. The back pressure would be taken from the under side of the pressure cylinder piston and conducted to low pressure side of the power rotor or piston of the engine.

A pressure relief valve is fitted to the engine block and enters the power cylinder. The relief valve is preset to release pressure above a certain level based on the engine characteristics. A pressure filling valve is provided to pressurize the engine.

The cold side of the engine would be fitted with multiple cooling fins to gain a small degree of air cooling. The liquid cooling arrangement would consist of circulating the coolant fluid through multiple parallel cooling bores in the cold engine block which are connected to fore and aft manifolds. Liquid lines would conduct the coolant to multiple radiators which would circulate and cool the liquid and return it to the engine. The radiator cooling surfaces must be larger than the usual automotive radiator due to the higher heat sink requirements of the Stirling engine. The rear manifold would contain the liquid coolant pump which would be driven from the output shaft by suitable means.

In operation, the starting heating means would be switched on to provide an electric flow to the heating rods which would quickly heat up the engine block. Concurrent to this electric heating, the catalytic or fuel burner heating unit would be started, but these will not build an effective heating level for several minutes. After that time has elapsed, the electric current to the heating rods will automatically be switched off by the time/switch, leaving the catalytic or other heating means to provide the necessary heating level to run the engine.

When the starting heating system is turned on, the pressurizing means would also be started so that the engine is brought up to the correct initial operating pressure. Essentially, the starting switch starts all three systems in operation, with the timer providing the changeover from electric heating to catalytic or burner heating.

The heating, cooling and pressurization system described is adaptable to any type of Stirling engine with the components arranged to suit the specific engine design.

It is an object of the invention to provide any Stirling engine with a quick starting means to improve its range of applications.

It is a further object of the invention to achieve a versatile heating arrangement for Stirling engines which will provide operation at maximum economy.

It is an object of the invention to gain high operating efficiency by the adoption of both air and liquid cooling means.

It is an object of the invention to utilize a power boost pressure means for Stirling engine power output control.

It is a final object of the invention to achieve a Stirling engine power system which operates at the highest possible overall efficiency and is nearly silent in operation.

The above and other aims and objects will be apparent from the detailed description hereinafter appearing when taken in conjunction with the drawings appended hereto and forming a part hereof.

It should be understood that variations may be made in the detail design without departing from the spirit and scope of the invention.

Referring to the drawings.

Figure 1:
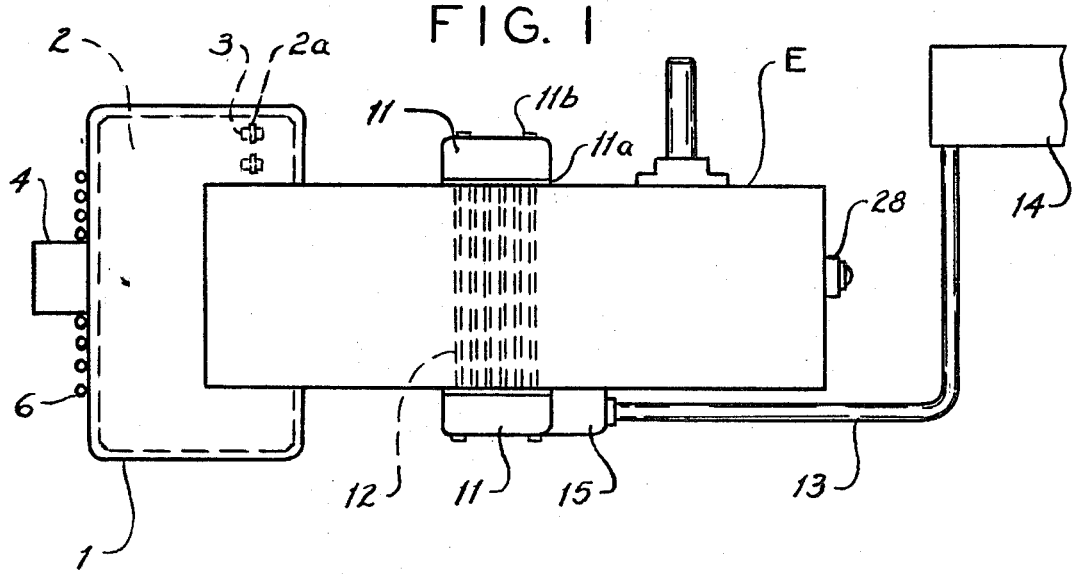
FIG. 1 is an elevation view of the complete system.
Figure 2:
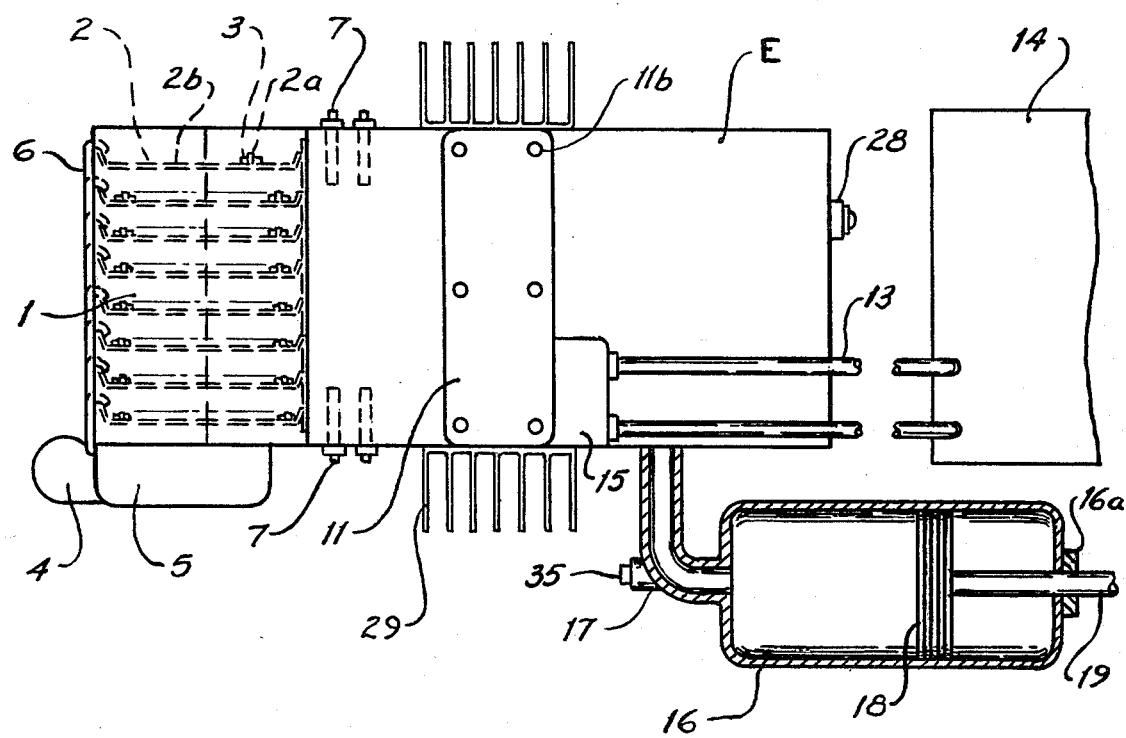
FIG. 2 is a plan view of the complete system.
Figure 3:
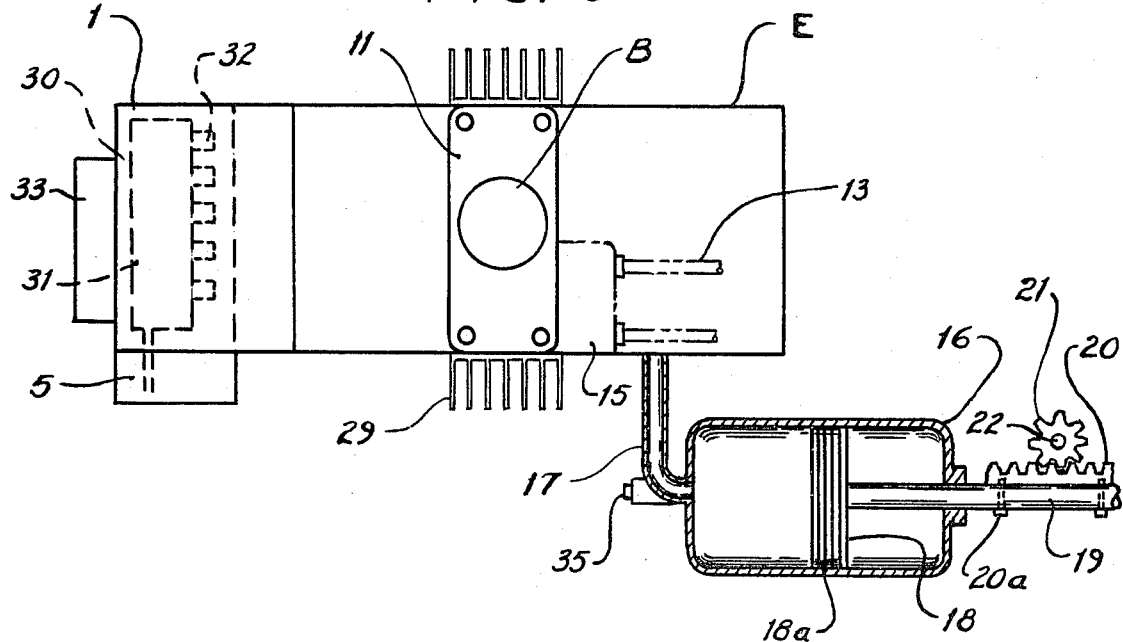
FIG. 3 is an elevation view of an alternate arrangement of the system.
Figure 4:
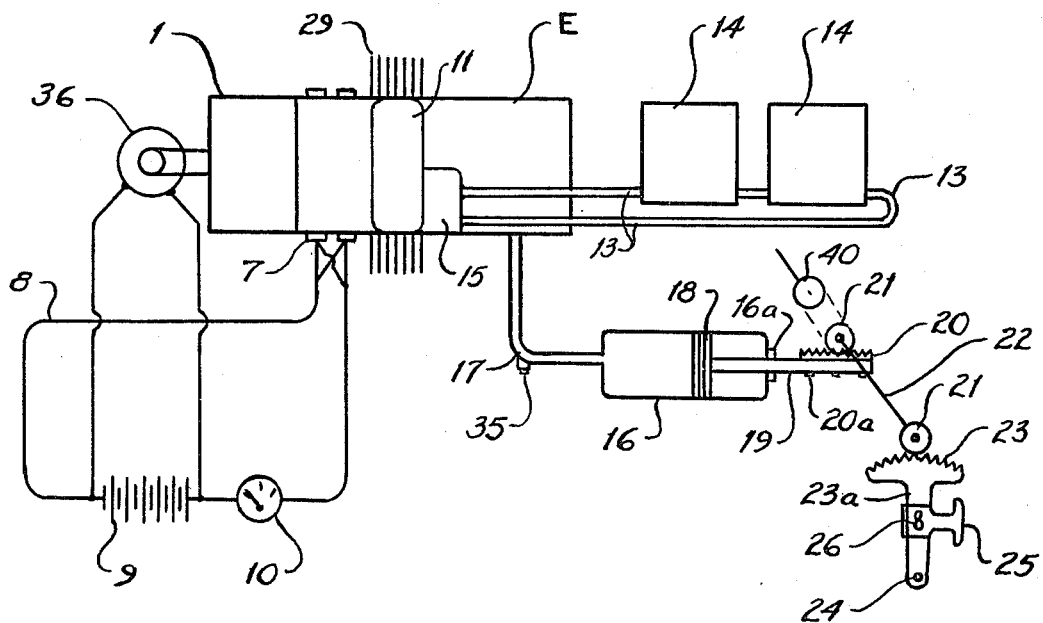
FIG. 4 is a schematic representation of the complete system.

Referring now to the drawing in detail: reference character E represents the Stirling cycle engine which may be of any type such as a reciprocating, multiple piston/cam or rotary engine to which the heating, cooling and pressurizing means are fitted. The heater housing 1 is secured to the engine E and may be of any necessary shape to provide a maximum of heat conducting surface for the hot side of the engine. The interior of the housing 1 is fitted with multiple trays 2 spaced at equal height intervals. The trays 2 are provided with clips 2a which retain the platinum catalytic strips 3 in contact with the tray top face 2b. The trays are dished to retain the fuel and are sufficiently deep and formed to keep the thin layer of fuel from spilling out.

The rotary pump 4, driven by any suitable means, delivers an equal amount of fuel to each tray by means of the fuel tubes 6. The fuel tube 6, diameters may be uniformly varied so that the smallest diameter tube moves fuel to and from the lowest tray while the largest diameter delivers an equal volume of fuel to the highest tray. The rotary pump 4 will be run in either direction so that the fuel is conducted to the trays when heating is required or to the fuel tank 5 for storage.

Heating plugs or rods 7 are internally secured within the hot side of the engine E. Electrical conductors 8 connect the heating plugs 7 to the electrical battery 9 with the time switch 10 controlling the circuit. The heating plugs may be connected by a parallel series or parallel circuit as required by the specific engine application. An alternator 36 is driven by the engine through suitable means.

The cooling of the engine is obtained by circulating liquid through the multiple parallel coolant bores 12 and are distributed and collected at the two manifolds 11. A gasket 11a seals the manifold against the engine E so that no leakage of the coolant liquid occurs. The screws 11b secure the manifolds 11 to the engine.

The cold side of the engine E may also be fitted with the cooling fins 29 for additional air cooling. The fins 29 would be placed on opposite faces of the engine and ninety degrees from the two manifolds 11 faces. A pump 15 secured to one manifold and driven by the engine, pumps the liquid through the system.

Transfer tubes 13 connect the two manifolds 11 to the multiple radiators 14 to complete the coolant circulation system. All necessary clamps and drain valves would be in the arrangement similar to that of an automotive coolant system.

A safety valve 28 provides for emergency internal pressure relief and is preset at a certain pressure level.

The pressure cylinder 16 may be mounted at any desired position relative to the engine with the pressure line 17 connected to the power bore of the engine E. The piston 18 and piston rings 18a form a pressure tight means for compressing the air volume, with the piston rod 19 reciprocating the piston 18 from the external power soure. An external packing gland 16a seals the piston rod 19 where it leaves the pressure cylinder 16. A gear rack 20 is secured to the end of the piston rod 19 with the screws 20a, and meshes with a pinion 21. A shaft 22 ties the pinion 21 to a second pinion 21 at the other end, which meshes with the control sector 23. The control sector 23 pivots on the pinion 24 and a foot pedal 25 is secured to the control sector arm 23a. The moment arm of the foot pedal 25 on the control sector arm 23a may be varied by adjusting its vertical position and locking the pedal with the thumb screws 26. A power assist means 40 is coupled to the 2nd pinion 21 or the piston rod 19.

The alternate heating source 30 would consist of the same housing 1 since this housing would provide a maximum of heat conducting surface for the particular engine E. A blow torch type of burner 31 with multiple burner nozzles 32 would be mounted inside the housing 1 and insulated from it. The fuel tank 5 would be located under the burner as shown with the hand air pump 33 providing the necessary pressure to force the fuel up to the burner nozzles 32. A powered pump similar to pump 4 may also be utilized to maintain the pressure inside the fuel tank.

For certain engine E applications it may be adequate to utilize forced air cooling within the parallel coolant bores 12. If air cooling is provided the radiators 14, transfer lines 13 and the pump 15 would be eliminated. A blower or blowers B may be fitted to the manifolds 11 to force air flow through the coolant bores 12.

A powered air compressor may be included in the system as an auxiliary unit to provide constant working air pressure to replace air pressure losses at the engine shaft seals. The air compressor lines would feed into the pressure filling valve 35 located on the pressure line 17.

A small air compressor may be directly driven by the engine to supply the constant working air pressure. An automatic pressure controller would start and stop the compressor.

What is claimed is:

1. A Stirling engine power system comprising two complementary heating arrangements, a heating means consisting of multiple electrically heated rods uniformly disposed within said Stirling engine, sufficient wattage means to provide heating of electrical elements within the said heated rods, time switch control means for controlling the said heated rods, the a second heating means disposed on said engine consisting of a catalytic type heater, fuel storage means for the said catalytic type heater, fuel deliver means for the said catalytic type heater, a cooling means consisting of multiple parallel coolant bores uniformly disposed through the cold side of the said Stirling engine, two manifolds disposed over all of the said parallel coolant bores at each side of the said Stirling engine, transfer tubes connecting the said two manifolds with multiple radiators, sealing means at all connections, pumping means disposed at one of the said two manifolds, a pressurized cylinder with a volume equal to or greater than the internal volume of the said Stirling engine, piping means connecting said pressurized cylinder with the internal volume of said Stirling engine, a reciprocating sealed piston within the said pressurized cylinder, a piston rod secured to the said sealed piston rod secured to the said sealed piston which protrudes through one end of the said pressurized cylinder, sealing and bearing means secured to the said pressurized cylinder in sliding contact with the said piston rod, a powered reciprocating means in communication with the protruding end of the said piston rod.

2. The invention according to claim 1 in which the cold side of the said Stirling engine is fitted with multiple cooling fins on the exposed cold surfaces.

3. The invention according to claim 1 in which the said Stirling engine is provided with a safety valve in free communication with the internal gas volume.

4. A Stirling engine power system comprising two complementary heating arrangements, a heating means consisting of multiple electrically heated rods uniformly disposed within the hot side of said Stirling engine, electrical battery means for heating of the said heated rods, time switch control means within the electrical circuitry for the said heated rods, a second heating means disposed at the hot side consisting of a catalytic heater, uniformly disposed trays within the said catalytic heater containing an equal number of platinum strips secured to the surface of said uniformly disposed trays, fuel storage tank disposed at the bottom of the said catalytic heater, a bi-directional fuel pump secured to said fuel storage tank with communication means to the said fuel storage tank, multiple fuel delivery tubes in free communication with the said bi-directional fuel pump and each of the said multiple trays, a cooling means consisting of multiple parallel cooling bores uniformly disposed through the cold side of the said Stirling engine, air blower means disposed over all of the said parallel cooling bores at one side of said Stirling engine, a pressurized cylinder with a volume equal to or greater than the internal volume of the said Stirling engine, communication means between pressurized cylinder and the internal volume of said Stirling engine, a reciprocating sealed piston within the said pressurized cylinder, a piston rod secured to the said sealed piston which protrudes through one end of the said pressurized cylinder, sealing and guidance means secured to the said pressurized cylinder in sliding contact with the said piston rod, a geared rack secured to the protruding end of the said piston rod, a first pinion meshing with said gear rack, a sector meshing with a second pinion which is coaxially fixed to the said first pinion, shaft and bearing means supporting both said pinions and sector, a foot pedal disposed near the midpoint of the said sector.

5. The invention according to claim 4 including a pressure filling valve disposed on the said communication means between said pressurized cylinder and the internal volume of said Stirling engine.

6. The invention according to claim 4 including an electrical alternator driven by the said Stirling engine, the electrical alternator connected to said electrical battery means.

7. A Stirling engine power system comprising two complementary heating arrangements, a heating means consisting of multiple electrically heated rods uniformly disposed within said Stirling engine, sufficient wattage means to provide heating of electrical elements within the said heated rods, time switch control means for the said heated rods, a heating means consisting of a gas fuel burner under pressure, a gas storage tank disposed under the said gas fuel burner, a pressurizing means secured to the said fuel storage tank communicating with the said fuel storage tank, a cooling means consisting of multiple parallel coolant bores uniformly disposed through the cold side of said Stirling engine, two manifolds disposed over all of said parallel coolant bores at each side of said Stirling engine, transfer tubes connecting said two manifolds with multiple radiators, sealing means at all connections, pumping means disposed at one of said two manifolds, a pressurized air cylinder with a volume equal to or greater than the internal volume of said Stirling engine, piping means connecting said pressurized air cylinder with the internal volume of said Stirling engine, a reciprocating sealed piston within said pressurized air cylinder, a piston rod secured to said sealed piston which protrudes through one end of said pressurized air cylinder, sealing and bearing means secured to said pressurized air cylinder in sliding contact with said piston rod, a powered servo reciprocating means in communication with the protruding end of said piston rod.

8. A stirling engine power system comprising two complementary heating arrangements, a heating means consisting of multiple electrically heated rods uniformly disposed within said Stirling engine, sufficient wattage means to provide heating of electrical elements within said heated rods, time switch control means for said heated rods, a heating means consisting of a liquid fuel burner under air pressure, a fuel storage tank disposed under said liquid fuel burner, a pressurizing means secured to said fuel storage tank, control means for fuel and air pressure flow, a cooling means consisting of multiple parallel liquid coolant bores uniformly disposed through the cold side of said Stirling engine, two manifolds disposed over all of said parallel coolant bores at each side of said Stirling engine, transfer tubes connecting said two manifolds with multiple radiators, sealing means at all connections, pumping means driven by said Stirling engine, a pressurized cylinder with a volume equal to or greater than the internal volume of said Stirling engine, piping means connecting said pressurized air cylinder with the internal volume of said Stirling engine, a reciprocating sealed piston within said pressurized cylinder, a piston rod secured to said sealed piston which protrudes through one end of said pressurized cylinder, sealing and bearing means secured to said pressurized air cylinder in sliding contact with said piston rod, a powered servo reciprocating means in communication with the protruding end of said piston rod.

References Cited

UNITED STATES PATENTS

| 2,611,234 | 9/1952 | Horowitz | 60—24 |
| 2,616,251 | 11/1952 | Rinia et al. | 60—24 |
| 3,036,427 | 5/1962 | Meijer | 60—24 |
| 3,050,933 | 8/1962 | Fokker | 60—24 |
| 3,319,416 | 5/1967 | Renshaw | 60—24 |
| 3,355,881 | 12/1967 | Brandes | 60—24 |

MARTIN P. SCHWADRON, Primary Examiner

L. J. PAYNE, Assistant Examiner

U.S. Cl. X.R.

62—6